(12) United States Patent
Van Ee

(10) Patent No.: US 7,895,890 B2
(45) Date of Patent: Mar. 1, 2011

(54) LIQUID DEPTH SENSING AND IDENTIFICATION SYSTEM

(76) Inventor: William J. Van Ee, Cincinnati, OH (US)

( * ) Notice: Subject to any disclaimer, the term of this patent is extended or adjusted under 35 U.S.C. 154(b) by 408 days.

(21) Appl. No.: 12/149,783

(22) Filed: May 8, 2008

(65) Prior Publication Data

US 2009/0007660 A1 Jan. 8, 2009

Related U.S. Application Data

(60) Provisional application No. 60/929,587, filed on Jul. 3, 2007.

(51) Int. Cl.
 G01F 23/14 (2006.01)
 G01N 37/00 (2006.01)
(52) U.S. Cl. .................. 73/298; 73/61.41; 73/61.43; 73/61.47; 73/290 R; 73/291; 73/299
(58) Field of Classification Search ............... 73/61.41, 73/61.43, 61.47, 61.78, 290 B, 290 R, 291, 73/292, 298, 299
 See application file for complete search history.

(56) References Cited

U.S. PATENT DOCUMENTS

| | | | | |
|---|---|---|---|---|
| 2,604,778 | A * | 7/1952 | Marquardt | 73/439 |
| 3,200,971 | A * | 8/1965 | Trethewey | 414/148 |
| 3,729,997 | A | 5/1973 | Luke | |
| 3,987,675 | A | 10/1976 | Harrison | |
| 4,297,081 | A | 10/1981 | Irvin | |
| 4,639,738 | A * | 1/1987 | Young et al. | 347/89 |
| 4,669,309 | A * | 6/1987 | Cornelius | 73/299 |
| 4,711,127 | A * | 12/1987 | Hafner | 73/302 |
| 5,005,408 | A * | 4/1991 | Glassey | 73/301 |
| 5,059,954 | A | 10/1991 | Beldham et al. | |
| 5,090,242 | A * | 2/1992 | Hilton | 73/302 |
| 5,163,324 | A | 11/1992 | Stewart | |
| 5,167,144 | A * | 12/1992 | Schneider | 73/54.02 |

(Continued)

FOREIGN PATENT DOCUMENTS

JP 60015522 A * 1/1985

(Continued)

OTHER PUBLICATIONS

Website, http://www.sablesys.com/trss3.html, SS-3 Subsampler mass flow meter, three sheets printed on May 3, 2006.

*Primary Examiner*—David A. Rogers
(74) *Attorney, Agent, or Firm*—Richard C. Litman

(57) ABSTRACT

The liquid depth sensing and identification system determines both the pressure head or depth, and therefore the quantity, of a liquid in a tank, as well as determining the characteristics of the liquid at the bottom of the probe. Two principles of operation are disclosed herein. The system may use a gas bubble collector about the outlet end of the purge tube, with the difference in height of the collector and purge tube mouths defining the very small difference in pressure head required to resolve the bubble emission characteristics produced in different liquids. Alternatively, the system incorporates a mass flow sensor capable of detecting minute changes in mass flow as bubbles are emitted from the purge tube in order to determine the type and characteristics of the liquid. The system operates using an open loop principle of operation, with no feedback provided to control the purge pump.

20 Claims, 10 Drawing Sheets

U.S. PATENT DOCUMENTS

| | | | |
|---|---|---|---|
| 5,524,682 A * | 6/1996 | Amonson | 141/95 |
| 5,636,547 A * | 6/1997 | Raj et al. | 73/299 |
| 5,642,053 A | 6/1997 | Heckman | |
| 5,650,561 A * | 7/1997 | Tubergen | 73/37 |
| 5,661,228 A * | 8/1997 | Young | 73/40 |
| 5,705,747 A * | 1/1998 | Bailey | 73/290 R |
| 5,987,981 A | 11/1999 | Boer | |
| 6,510,736 B1 | 1/2003 | Van Ee | |
| 6,513,376 B1 | 2/2003 | Prather et al. | |
| 6,539,796 B2 | 4/2003 | Shirai et al. | |
| 6,601,449 B1 * | 8/2003 | Jones et al. | 73/299 |
| 6,640,626 B2 | 11/2003 | Saikalis et al. | |
| 6,647,781 B2 | 11/2003 | Su | |
| 6,799,457 B2 * | 10/2004 | Bouchard | 73/301 |
| 6,802,219 B2 * | 10/2004 | Joseph et al. | 73/290 R |
| 6,931,926 B1 | 8/2005 | Van Ee | |
| 7,071,000 B2 | 7/2006 | Wang et al. | |
| 7,136,767 B2 | 11/2006 | Shajii et al. | |
| 2003/0140697 A1 | 7/2003 | Van Ee | |
| 2004/0020288 A1 * | 2/2004 | Tsukamoto et al. | 73/298 |
| 2006/0213263 A1 | 9/2006 | Kawanishi et al. | |
| 2006/0266111 A1 | 11/2006 | Gourlay et al. | |

FOREIGN PATENT DOCUMENTS

| | | |
|---|---|---|
| JP | 61056915 A * | 3/1986 |
| WO | WO 02/35189 | 5/2002 |

* cited by examiner

LIQUID DEPTH SENSING AND IDENTIFICATION SYSTEM

CROSS-REFERENCE TO RELATED APPLICATION

This application claims the benefit of U.S. Provisional Patent Application Ser. No. 60/929,587, filed Jul. 3, 2007.

BACKGROUND OF THE INVENTION

1. Field of the Invention

The present invention relates generally to purge or bubble tube devices used for the measurement of the depth of a quantity of liquid. More specifically, the present invention relates to a liquid depth sensing and identification system that incorporates a novel differential pressure sensor and/or a novel mass flow sensor to detect the bubble signature.

2. Description of the Related Art

The purge or bubble tube principle of detecting the depth of a quantity of liquid in a tank or container is well known. The present inventor has found more recently that it is possible to detect certain characteristics in the propagation of the bubbles as they leave the purge tube, or more precisely, certain characteristics in the variation of the pressure pulses as the bubbles are emitted from the end of the tube. These characteristics have been found to correlate with the type of liquid found at the end of the purge tube. Such a system is described in the present inventor's issued U.S. Pat. No. 6,931,926.

The liquid depth sensing and identification system of the present inventor's issued '926 U.S. Patent has been found to work quite well in the identification of various liquid types and can be used to detect contaminants, etc., in the bottom of a tank of liquid, e.g., water in a fuel tank, etc. The system described in the above noted '926 U.S. Patent relies upon the measurement of the pressure pulses over a period of time as the bubbles leave the end of the purge tube. The pressure variations are converted to a voltage, with the voltage generating a display of the pressure differences on a chart recorder or the like to indicate the specific "bubble signature" of the type of liquid at the end of the purge tube.

A problem with such a purge-type liquid identification system is that the pressure variations that create the "bubble signatures," and thus enable the system to determine the type of liquid at the end of the purge tube, are quite small. In contrast, the absolute pressure developed at the lower end of the purge tube due to the depth of the liquid in the tank or container can be quite high. This is particularly true in the case of a tank or container of relatively great depth, e.g., an underground gasoline storage tank of several feet in height, etc.

Looking at this problem in another way, it might be considered analogous to a need to magnify a very small portion of a large object in order to detect minute distinctions in the object. When a microscope is brought to bear upon the area in question, the minute distinctions may be readily visible, but the overall size or quantity of the object is not. When the magnification is reduced in order to bring the entire object into the field of view, the resolution needed is no longer available to detect the minute variations in the portion of interest in the object.

Returning to the principles of the present invention, it can be extremely difficult to detect the very small distinctions in the bubble pressure pulse variations due to different types of liquids while still providing the range necessary to measure the pressure head of the liquid in the tank between its full and empty depths. Thus a liquid depth sensing and identification system solving the aforementioned problems is desired.

SUMMARY OF THE INVENTION

The liquid depth sensing and identification system is a purge-type system, i.e., incorporating a bubble tube preferably extending to a point very near the bottom of the tank or container. The system incorporates sensors both for determining the overall pressure head or depth of liquid in a tank, and also for determining the type and/or condition of the liquid at the lower end of the purge tube.

Two principles of operation are disclosed herein. A first principle incorporates a bubble collector, disposed concentrically about the mouth of the purge tube. The lower edge of the collector is slightly higher than the lower end of the purge tube. As the purge tube emits a stream of gaseous bubbles during operation, the bubbles are captured by the collector as they escape from the end of the purge tube. A first or quantity pressure sensor is used to measure the overall pressure in the purge tube to determine the depth of the liquid, with a second or liquid quality or identification pressure sensor being incorporated to detect the minute variations in pressure occurring between the outlet of the purge tube and the pressure within the collector. The difference in vertical height between the lower edge of the purge tube and the lower edge of the bubble collector defines the resolution required to detect the very small variations in pressure pulses as the bubbles are emitted from the purge tube, regardless of the absolute pressure head or depth of liquid in the tank or container.

A second principle of operation incorporates a mass sensor for the liquid quality or identification sensor, rather than a pressure sensor. The mass flow sensor is installed in series with the purge flow and is capable of detecting minute changes in mass flow over time, as the mass of purge gas varies in accordance with bubble emissions from the lower end of the purge tube. Both systems utilize the open loop principle of operation, i.e., there is no feedback from any transducers or the like in the system to regulate the purge pump supplying the gas flow for bubble production. Both of the above noted systems are capable of providing the very fine resolution required to detect differences in the "bubble signatures" or characteristics resulting as the bubbles are emitted from the end of the purge tube in various types and conditions of liquids, as well as measuring the overall pressure head of the liquid in the container or tank for determining the depth and quantity of liquid in the tank.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a liquid depth sensing and identification system for simultaneously determining the pressure head or depth of a quantity of liquid while also identifying the specific type and/or condition of the liquid at the lower end of the probe of the apparatus. Two different principles of operation are disclosed herein, with FIGS. 1 through 5B illustrating different variations of the system using a pressure sensor principle of operation, and with FIG. 6 illustrating a device using a mass flow principle of operation.

Figure 1A:
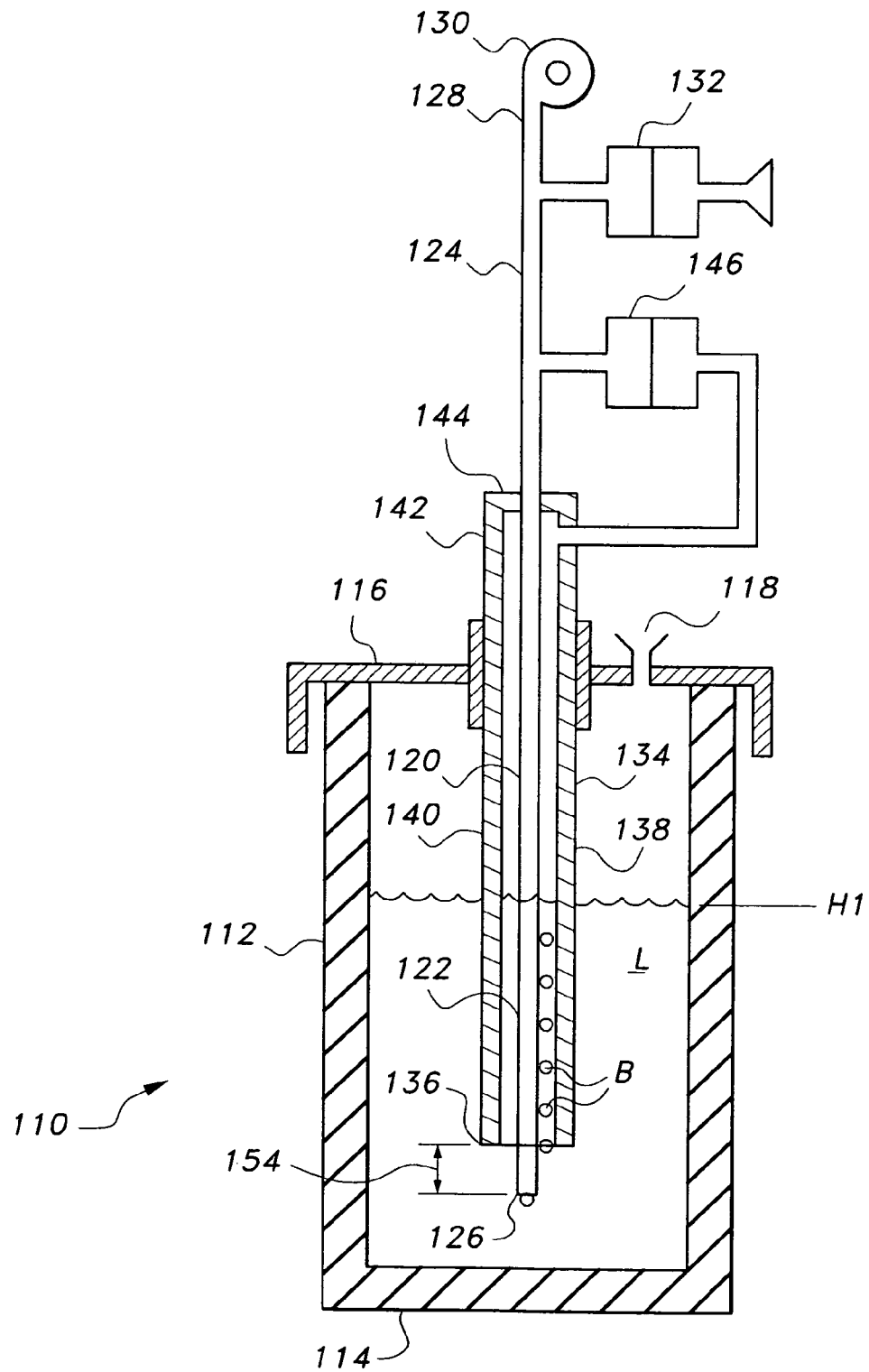
FIG. 1A is a simplified schematic side elevation view of a liquid depth sensing and identification system according to the present invention and using a differential pressure operating principle, shown in a first state having no differential pneumatic pressure.
Figure 1B:
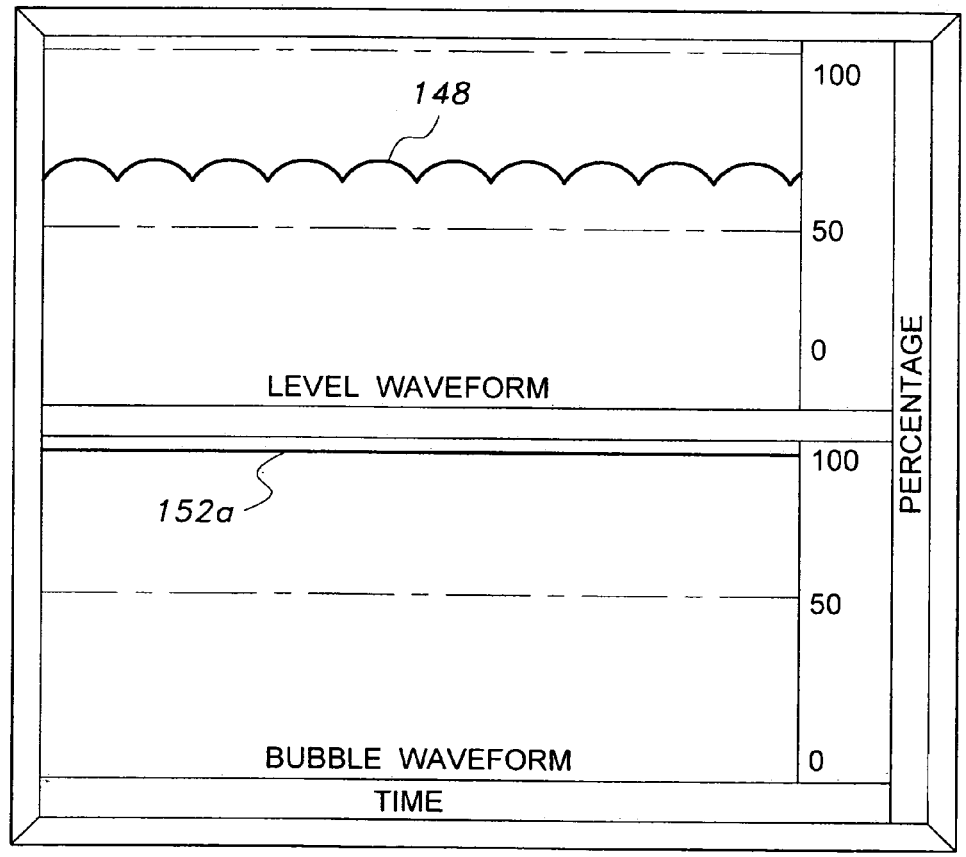
FIG. 1B is a display of the readout of the liquid depth sensing and identification system according to the present invention, showing the pneumatic pressure corresponding to the state of the apparatus of FIG. 1A.
Figure 2A:
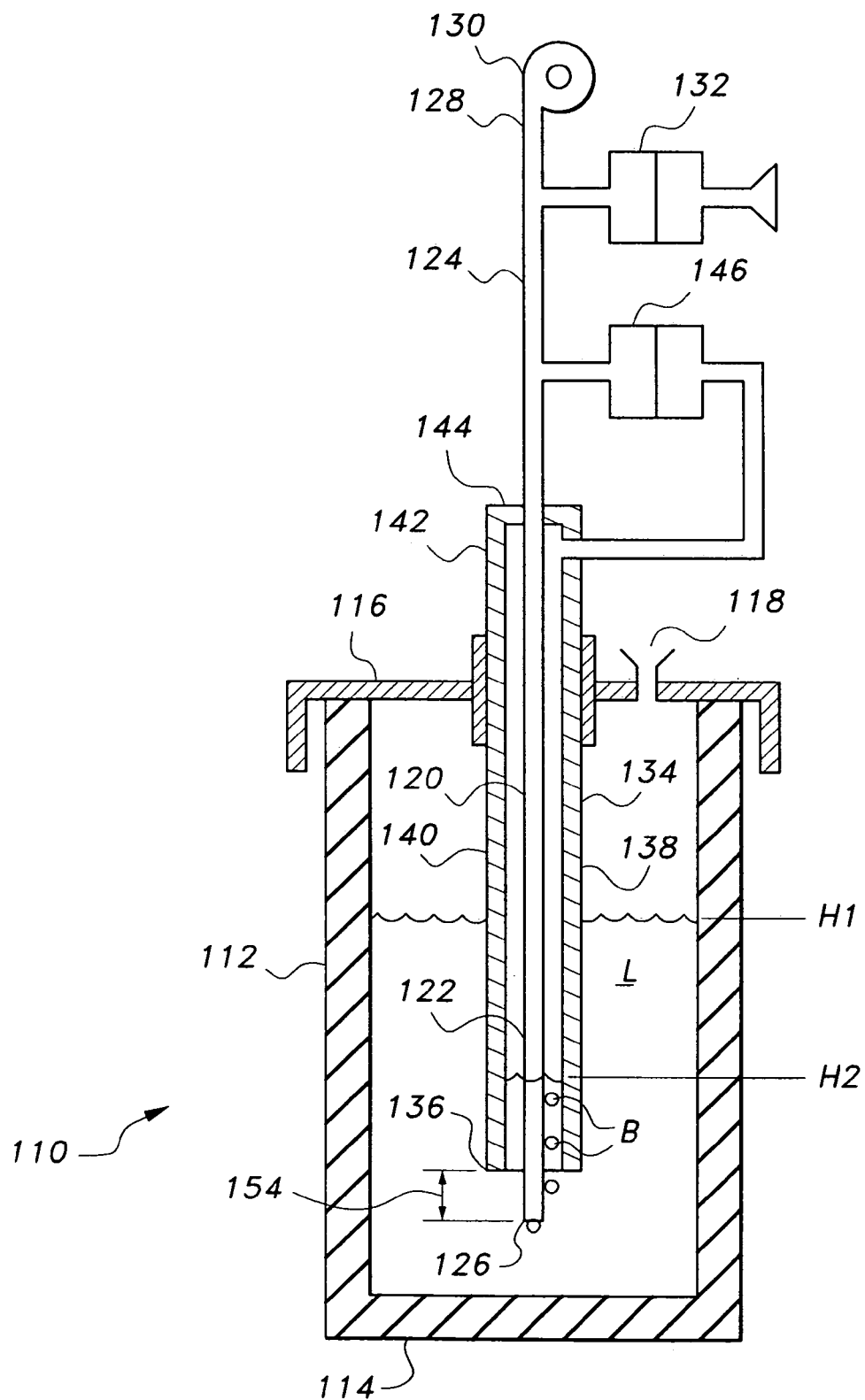
FIG. 2A is a schematic side elevation view of the apparatus of FIG. 1A, shown in a second state having a partial differential pneumatic pressure.
Figure 2B:
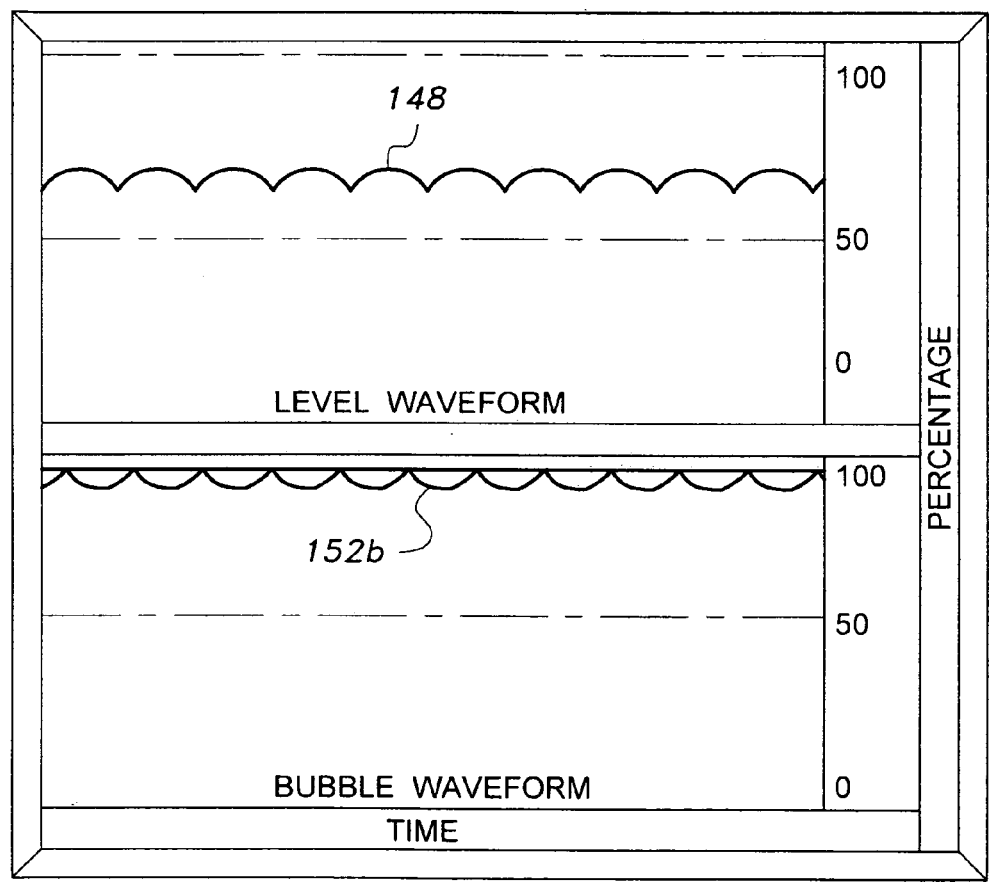
FIG. 2B is a display of the readout of the liquid depth sensing and identification system according to the present invention, showing the pneumatic pressure corresponding to the state of the apparatus of FIG. 2A.
Figure 3A:
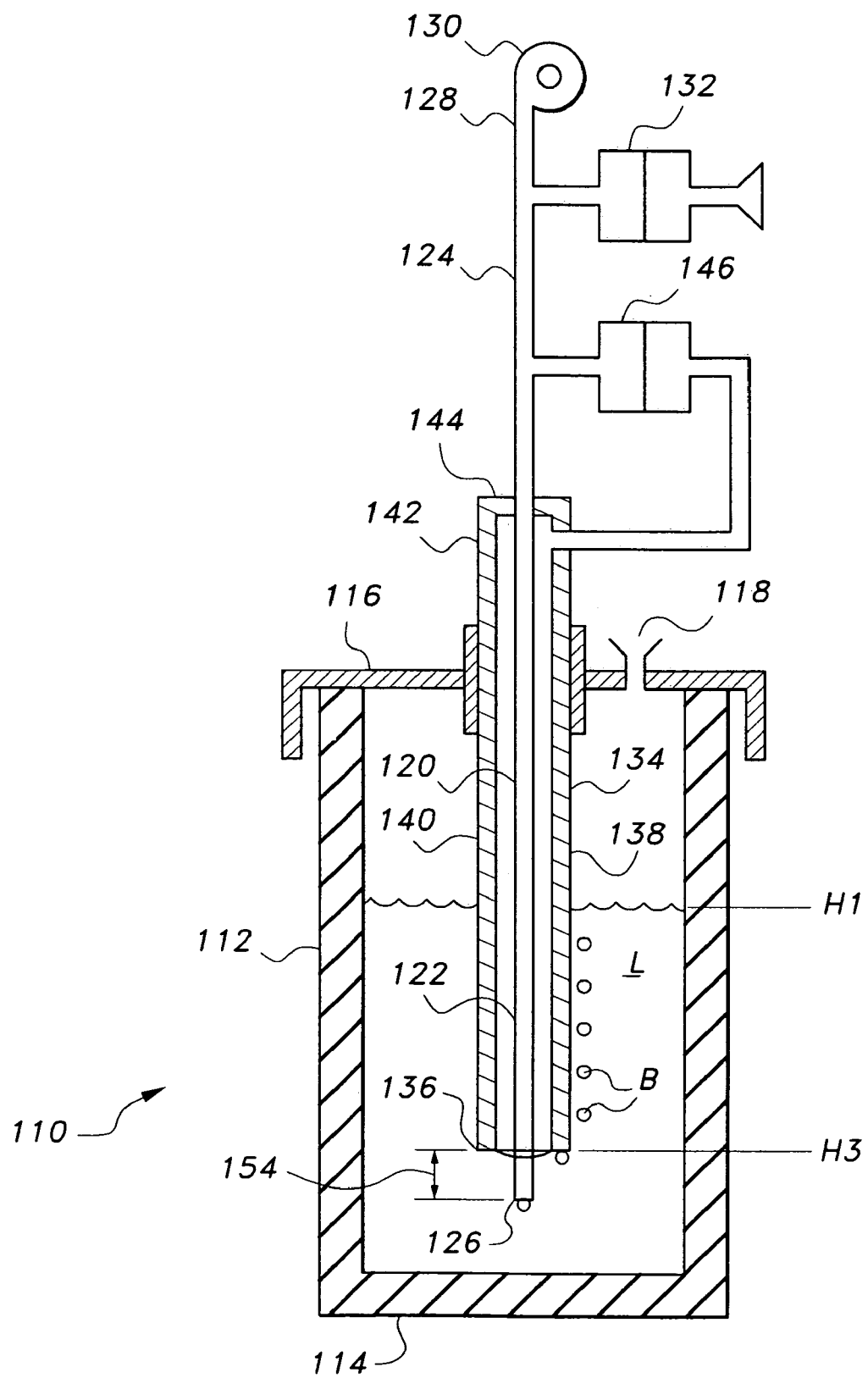
FIG. 3A is a schematic side elevation view of the apparatus of FIGS. 1A and 2A, shown in a third state of fully developed differential pneumatic pressure.
Figure 3B:
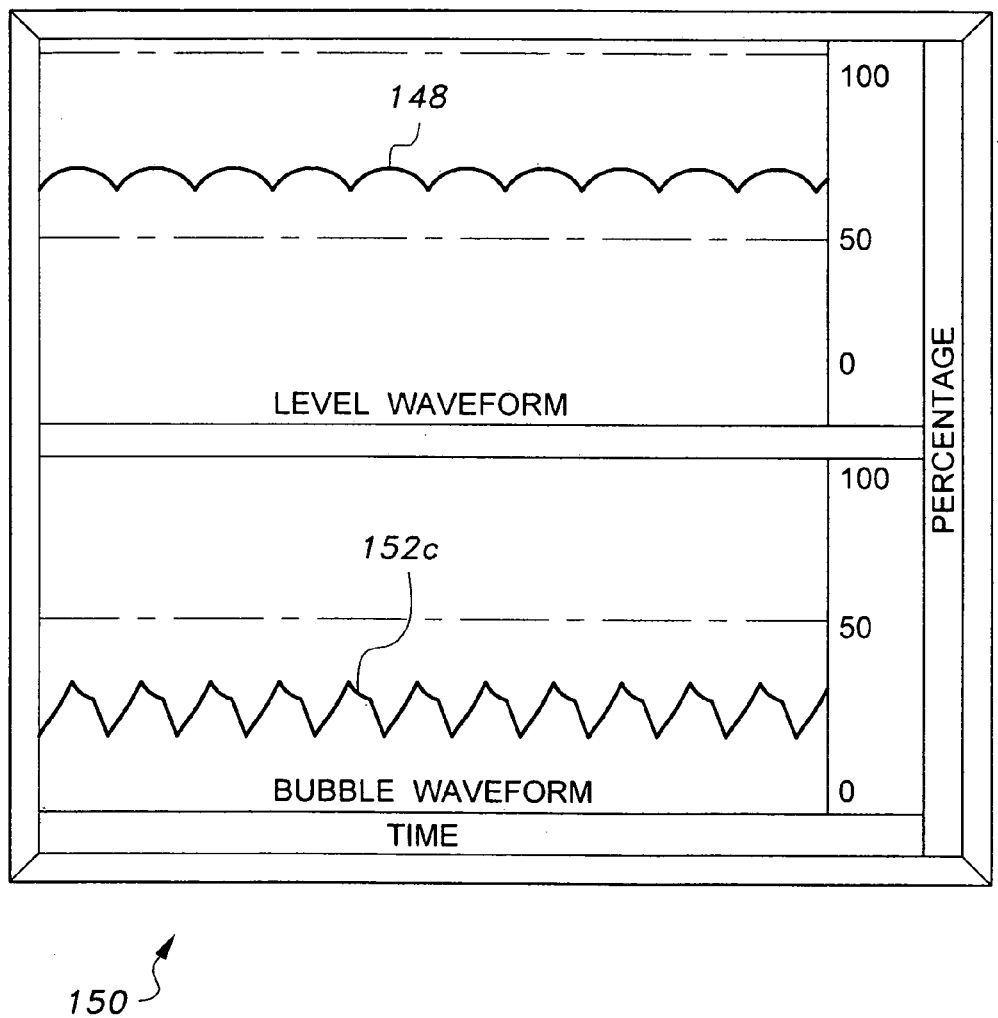
FIG. 3B is a display of the readout of the liquid depth sensing and identification system according to the present invention, showing the pneumatic pressure corresponding to the state of the apparatus of FIG. 3A.

FIGS. 1A, 2A, and 3A provide simplified schematic views in section of an apparatus illustrating the basic componentry and function of the pressure sensor version of the liquid depth sensing and identification system of the present invention, with FIGS. 1B, 2B, and 3B illustrating corresponding wave forms in accordance with the liquid levels or states illustrated in FIGS. 1A, 2A, and 3A. The physical apparatus illustrated in each of the FIGS. 1A, 2A, and 3A are identical to one another, with the only difference between the drawings being the liquid level within the gas collection chamber or tube of the device in order to show different stages of operation.

It should be noted that several components have been omitted from FIGS. 1A through 3B, as the schematics are intended only to explain the basic principle of operation of the pressure sensor operating version of the present invention. All componentry required for the operation of the system is illustrated in other drawings and explained further below in the discussion of those drawings.

The apparatus of FIGS. 1A, 2A, and 3A comprises a liquid container or vessel 110 having a liquid impervious peripheral wall 112 and floor 114 for holding a liquid L (e.g., water, fuel, oil, etc., or some combination thereof) therein. The container 110 may include a top or lid 116 thereon, with the top optionally further including a vent 118. Alternatively, the container may be completely closed with the exception of a fluid outlet and possibly a pressure relief valve or other means for relieving the partial vacuum in the container 110 as the liquid content is depleted. The container 110 of FIGS. 1A, 2A, and 3A resembles a beaker or the like, but it should be understood that the container 110 may have any practicable size, depth, and/or volume, up to and including very large and/or deep fuel storage tanks, water towers, vats, and the like.

A gas delivery dip tube 120 extends through a passage in the top or lid 116, with its lower portion 122 disposed within the container 110 and its opposite upper portion 124 extending outwardly beyond the container. The open lower end 126 of the dip tube 120 is preferably positioned only slightly apart from the floor 114, internal surface, or low point of the container 110, in order to be capable of measuring substantially the entire depth of the container 110. The opposite upper end 128 is connected to a pneumatic gas supply pump 130 located outside the container or tank 110, which operates to blow air (or other gas) downwardly through the dip tube 120. A liquid depth differential pressure sensor 132, also located outside the container 110, communicates pneumatically with the dip tube 120 and with the ambient air. Alternatively, the depth differential pressure sensor 132 may be connected pneumatically with the air or gas contained within the upper portion of a closed container to measure the difference between the internal pressure within the container or tank and the pressure at the bottom 126 of the dip tube 120.

The above-described system operates by the pneumatic pump 130 pumping air (or perhaps another gas, in a closed system) downwardly through the dip tube 120, with the air or gas departing the open lowermost end 126 of the dip tube 120 in the form of bubbles B. While the pressure in a liquid increases with depth, for all practical purposes the pressure of a gas within a closed container is equal at all points, even for relatively large containers or tanks. Thus, it will be seen that the pneumatic pump 130 must provide sufficient output pressure to slightly exceed the pressure at the lowermost output end 126 of the dip tube 120 in order for the air or gas within the tube 120 to be forced outwardly from the lower end 126 of the tube 120. However, once this occurs the gas pressure within the dip tube 120 remains close to constant (with minor variation due to the bubbles B breaking the surface tension of the liquid L as they escape the lower end 126 of the dip tube 120), i.e., about equal to the pressure of the liquid L at the lower end of the dip tube. The pressure within the dip tube 120 may be measured by the liquid depth pressure sensor 132 and equated to the pressure head of the liquid L at the bottom end 126 of the tube 120, and the depth of the liquid L may be determined accordingly.

The type of liquid at the lower end 126 of the dip tube 120 may be determined by analyzing the characteristics of the small pressure variations as the bubbles B escape the end of the dip tube. However, it is difficult to resolve these small pressure variations in the bubble cycle when the liquid pressure head is relatively large due to a relatively large liquid depth in the container or tank. The minute variations in gas pressure during the bubble cycle are much easier to read when the liquid pressure head is relatively small, i.e., a relatively shallow depth of liquid. However, this "shallow depth" is not necessarily defined by the absolute depth of the lowermost end 126 of the dip tube 120 below the surface of the liquid L within the container in general. Rather, it is only necessary to provide some local liquid reference level near the lowermost end 126 of the dip tube 120, as the air or gas pressure remains substantially uniform throughout the container 110 and dip tube 120, as noted further above.

Figure 4:
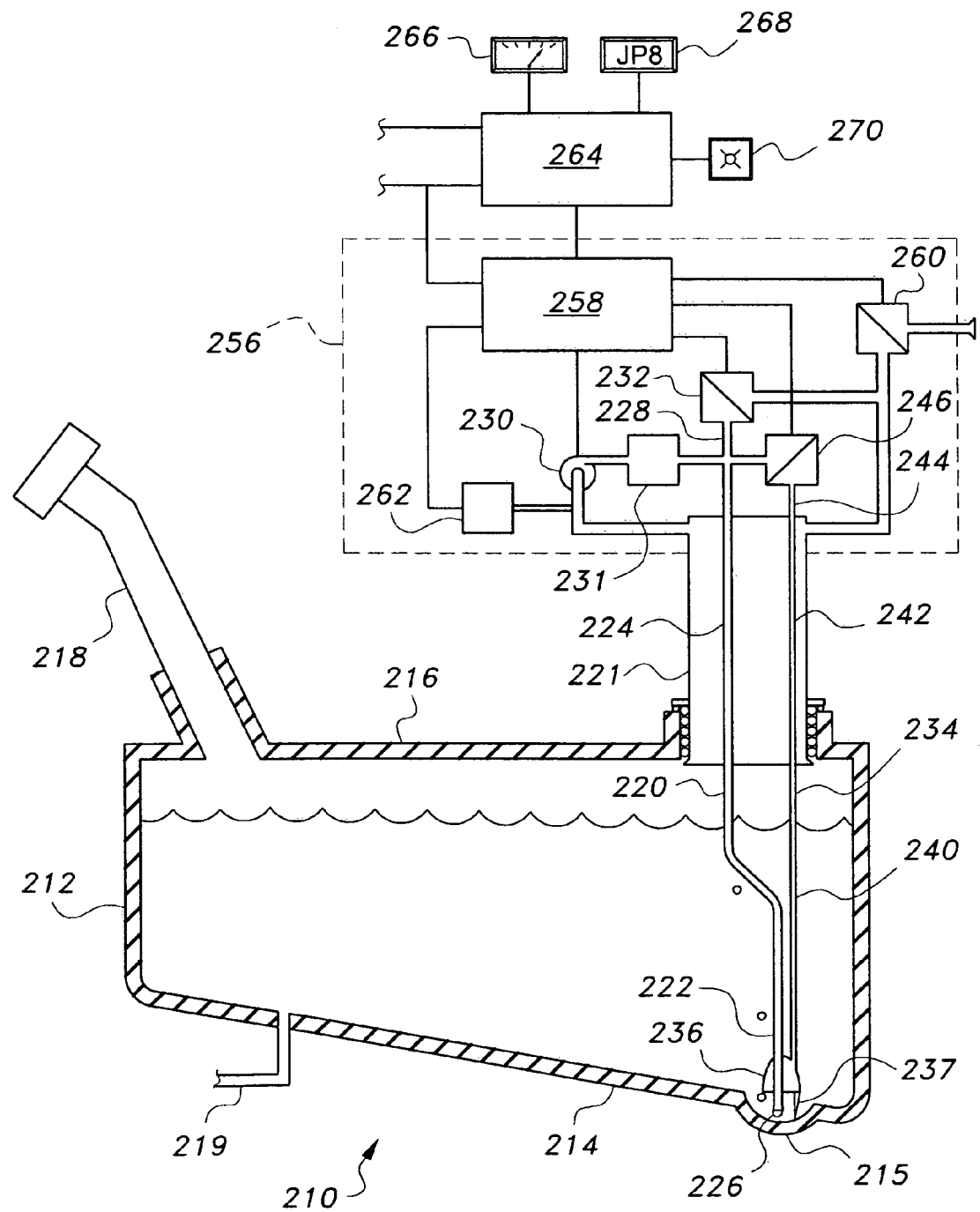
FIG. 4 is a schematic side elevation view of an exemplary liquid depth sensing and identification system according to the present invention, incorporating a differential pressure liquid level and identification probe similar to that of FIGS. 1A, 2A, and 3A.

This is accomplished by a gas collector 134, comprising a chamber or tube surrounding at least the lower portion 122 of the dip tube 120. In the example of FIGS. 1A, 2A, and 3A, the gas collector 134 comprises a tube that concentrically surrounds the dip tube 120. Other gas collector configurations are also possible, as shown in FIG. 4 and discussed further below. The gas collector tube 134 of the apparatus 110 of FIGS. 1A, 2A, and 3A includes an open lower collector mouth or edge 136 positioned slightly above (i.e., a fraction of an inch or so) the lower outlet end 126 of the dip tube 120. The collector 134 includes an outlet tube portion 138 extending upwardly from collector mouth 136, with the outlet tube 138 having a lower portion 140 disposed within the container 110 and an upper portion 142 external to the container 110. The uppermost end 144 of the collector tube 134 is closed to ambient air, and communicates only with one side of a liquid quality differential pressure sensor 146, installed externally to the container 110 and communicating pneumatically with the upper portion 124 of the dip tube 120 on one side or port and the upper portion 142 of the gas collector tube 134 on the other side or port. There is no net flow through either the liquid depth differential pressure sensor 132 or the liquid quality differential pressure sensor 146, as indicated by the medial line in each sensor. Rather, the sensors 132 and 146 sense the pressure differential between their respective sides, and are plumbed in parallel with the pneumatic pump 130 and dip tube 120.

The device of FIGS. 1A, 2A, and 3A operates by initially activating the pneumatic pump 130 to force air (or other gas, as desired) downwardly through the dip tube 120. When the pressure of the air or gas within the dip tube 120 is equal to the liquid pressure at the lower end 126 of the dip tube, the air or gas will bubble from the mouth of the dip tube 120 as a string of bubbles B, generally as shown in FIG. 1A. At this point, the differential pressure across the liquid depth (or pressure head) differential sensor 132 stabilizes, and may be converted (with appropriate equipment) to display the depth of the liquid L above the lower outlet end 126 of the dip tube 120, generally as indicated on the upper line 148 of the chart recorder 150 representation of FIG. 1B. This liquid depth level line 148 represents the depth of the liquid L within the container 110. It will be seen that other display configurations may be used as desired, e.g., analog gauge, digital readout, etc.

However, rather than escaping to the surface of the liquid L within the container 110, the bubbles B float upwardly and are captured within the collector chamber or tube 134. It will be seen that initially the air or gas pressure within the collector tube 134 is identical to the air or gas pressure within the upper portion of the container 110, as the liquid level or head H1 within the collector tube 134 is the same as the liquid level or head H1 in the remainder of the container 110 as shown in the initial operation of FIG. 1A. The liquid quality differential pressure sensor 146, connected pneumatically between the gas or air pressures within the dip tube 120 and the collector chamber or tube 134, is set to read a much smaller or finer pressure variation than the liquid depth pressure sensor 132.

In FIG. 1A, where the gas or air pressure within the collector tube 134 is essentially the same as that within the upper portion of the container 110, the pressure variation across the liquid quality sensor 146 is essentially the same as that across the liquid depth sensor 132. This relatively large pressure differential is much too large for the quality sensor 146 to read, and results in a one hundred percent, flat line readout 152a on the chart recorder 150 of FIG. 1B as the liquid quality sensor 146 is overwhelmed. Thus, it is not possible to determine the quality or type of liquid L at the bottom 126 of the dip tube 120 and collector chamber 134 when such a large pressure differential exists and overcomes the relatively small or fine pressure variations over time, which characterize the "bubble signatures" of various liquids.

However, as operation of the device or apparatus continues, as shown in FIG. 2A, the bubbles B emitted from the mouth 126 of the dip tube 120 will continue to collect within the closed volume within the collector chamber or tube 134, in the form of additional air or gas within the chamber or tube 134 as they reach the surface of the liquid therein. It will be seen that, as more and more bubbles are captured within the collector chamber or tube 134, the liquid level or head within the chamber or tube 134 will be lowered accordingly.

FIG. 2A illustrates an intermediate point in the operation of the device, wherein the liquid level or head H2 within the collector tube or chamber 134 has been forced downwardly within the tube 134 due to the continuing bubble emissions from the dip tube 120 being captured by the collector chamber or tube 134. The chart recorder 150 representation of FIG. 2B illustrates this scenario. The liquid depth indication line 148 is essentially unchanged in FIG. 2B from its level as shown in FIG. 1B, as the liquid level within the container 110 is substantially unchanged (with the exception of the volume of liquid pushed out of the collector tube 134 and into the main volume of the container 110).

However, it will be noted that there is a much smaller difference in liquid depth between the liquid level or head H2 within the collector tube 134 and the lower end 126 of the dip tube 120 in the scenario of FIG. 2A than shown in FIG. 1A. This smaller difference in liquid depth equates to a smaller difference in pressure head. At some point, the lower differential pressure liquid quality pressure sensor 146 will begin to detect the differences in pressure due to bubble propagation, resulting in an initial wave form indication 152b as shown in FIG. 2B.

In FIG. 3A, the apparatus is shown in a state wherein it has been operating for a sufficient period of time to cause the collector chamber or tube 134 to become completely filled with air or gas, placing the liquid level or head H3 within the collector tube or chamber 134 at the mouth or lower lip 136 of the chamber 134. This results in the difference in liquid levels between the collector chamber 134 and the outlet end 126 of the dip tube 120 being equal to the small installed height difference 154 between the mouth 136 of the collector chamber 134 and the outlet or mouth 126 of the dip tube 120. This relatively small difference 154 in height equates to a correspondingly small difference in pressure head, with variations therein being readily detectable by the liquid quality pressure sensor 146. An exemplary readout of the bubble wave form or "bubble signature" of the produced by the bubbles B as they leave the end 126 of the dip tube 120 in FIG. 3A is shown as bubble wave form line 152c in FIG. 3B.

The present inventor has found that different liquids will produce different bubble wave forms as the bubbles B are emitted from the lower end of the dip tube 120, with those wave form differences being due to the surface tension and viscosity of the liquid at the lower end of the dip tube 120. A disclosure of this general principle is found in the present inventor's issued U.S. Pat. No. 6,931,926. However, the apparatus illustrated in FIGS. 1A through 3B provides a means of detecting these fine wave form or "bubble signature" distinctions, and thus identifying the liquid at the bottom 126 of the dip tube 120, even though the liquid depth and corresponding pressure head is quite high.

FIG. 4 of the drawings is a schematic elevation view in section of an operable system for a closed container, e.g., a fuel tank 210 or the like. The tank 210 includes a surrounding peripheral wall 212, floor 214, and closed top 216. A filler neck 218 extends from the top 216 of the tank, or, alternatively, from the upper side. A delivery outlet 219 extends from the bottom 214 of the tank.

The top of the tank 210 includes a sealed standpipe or housing 221 extending upwardly therefrom, with the lower end of the standpipe 221 communicating with the interior of the tank 210 and providing a passage through the top of the tank for the dip tube 220 and collector tube 234. The dip tube 220 includes a lower portion 222 disposed within the tank 210 and an opposite upper portion 224 extending from the top of the tank 210 and passing through the standpipe 221. The dip tube 220 further includes a lowermost end 226 preferably positioned slightly above the bottom 214 of the tank 210, perhaps within a low point or sump 215 formed therein, and an opposite upper end 228 communicating pneumatically with a liquid depth differential pressure sensor 232, generally the same as the sensor 132 of FIGS. 1A, 2A, and 3A.

Air and vapor from the upper portion of the tank 210 is supplied from the standpipe 221 to a pneumatic pump 230, which supplies air and/or vapor to the upper portion 224 of the dip tube 220. A suppressor 231 may be installed within the pneumatic line between the pump 230 and the upper end portion 224 of the dip tube 220, to dampen pneumatic pressure pulses from the pump 230.

The collector tube 234 includes a lowermost end having an inverted cup-like or bell-like chamber 236, with the lower end portion 222 of the dip tube 220 passing through the wall of the lower end chamber 236 of the collector tube 234. The wall of the chamber 236 is sealed about the lower end portion 222 of the dip tube 220 to prevent the escape of air or gas therebetween.

The lower end chamber 236 of the collector tube 234 may include a standoff 237 extending therefrom to position the lower ends 226 and 236 of the dip tube 220 and collector tube 234 at the proper height above the tank floor 214 or sump 215. The collector tube 234 includes a lower portion 240 extending upwardly from the lower end chamber 236 and through the interior of the tank 210, and an upper portion 242, which passes through the standpipe 221 and terminates in an upper end 244, which communicates pneumatically with the liquid quality differential pressure sensor 246. The top of the standpipe 221 is sealed about the upper portions 224 and 242 of the dip tube 220 and collector tube 234 to create a closed container system.

The two tubes 220 and 234 are non-concentric in the embodiment of FIG. 4, but the concentric tube configuration shown in FIGS. 1A, 2A, and 3A may be used in the embodiment of FIG. 4, if so desired.

The pneumatic pump 230 with its suppressor output 231, the liquid depth pressure sensor 232, and the liquid quality pressure sensor 246 may be enclosed within a controller housing 256 (shown in broken lines in FIG. 4), with the housing 256 being attached to the upper end of the standpipe 221. The housing 256 further contains a controller 258, which communicates electrically with and controls the operation of the pneumatic pump 230. Although both the liquid depth pressure sensor 232 and the liquid quality pressure sensor 246 communicate electrically with the controller 258, this is only for the purpose of shutting off the pump 230 in the event that the tank 210 is empty, i.e., the pressures sensed by the two sensors 232 and 246 equalize, or when power is switched off, and for starting the pump 230 when there is liquid in the tank 210 and power is switched on (e.g., vehicle ignition, etc.). Operation of the pump 230 is by an open loop system, with the pump receiving no other feedback. The pump may be operated continuously or intermittently if desired, e.g., by means of a conventional timer chip disposed within the controller 258, or by other automated or even manual means, if so desired.

The controller housing 256 may include components additional to the components discussed above. For example, an ambient pressure sensor 260 may be provided, with the sensor 260 sensing external pressure and comparing that ambient external pressure to the pressure within the unvented tank 210 by means of a pneumatic connection to the standpipe 221 or other suitable connection. The sensor 260 communicates this information electrically to the controller 258. Such ambient pressure sensors are conventional in unvented fuel tank systems for motor vehicles and may be incorporated in the present system as described above. An absolute atmospheric pressure sensing device, e.g., an altimeter, may be included as part of, or in lieu of, the ambient pressure sensor 260, if so desired, for vented tank or container systems in which the tank interior is at the same air pressure as ambient.

In addition, a temperature sensor 262 may be provided, with the temperature sensor 262 receiving temperature signals or information from the air and/or vapor within the tank 210 by means of the return line extending from the standpipe 221 to the inlet of the pneumatic pump 230, or other appropriate temperature source. This provides a reasonably accurate temperature indication of the liquid in the tank 210, as the air and/or vapor passing through the return line to the pump 230 are constantly circulating through the liquid in the tank 210, and thereby taking on the same temperature characteristics. It is important to know the temperature and pressure within the tank 210, as the temperature of the liquid affects the viscosity in most cases (e.g., oil) and perhaps the surface tension, and the pressure within the tank 210 will affect the surface tension. These two factors will produce an effect on the "bubble signature" detected by the liquid quality differential pressure sensor 246, and may be compensated for with appropriate programming of the system.

The controller housing 256 and its internal componentry, e.g., controller 258, etc., is preferably located adjacent the tank standpipe 221, and, in fact, the controller housing 256 and its componentry, the standpipe 221, the dip tube 220, and collector tube 234 may be provided as a unit for installation through an upper passage in the top 216 of the tank 210. However, additional information relating to liquid quantity contained within the tank and the quality (type, contaminants, etc.) of the liquid at the bottom of the tank are preferably provided to a location remote from the tank 210 but convenient to the operator of the system (motor vehicle, boat or ship, aircraft, etc.).

This is indicated by a processor 264 disposed remotely from the controller housing 256 and controller 258, but communicating electrically therewith. The processor 264 serves to process the electrical signals provided from the controller 258 regarding the quantity and condition or quality of the liquid in the tank 210, and display these factors on a liquid depth indicator 266 (e.g., quantity gauge) and a liquid quality indicator 268. The distinctive "bubble signature" resulting from different bubble sizes and rates of propagation due to the different viscosities and surface tensions of different liquids, can be detected as described in the present inventor's issued U.S. Pat. No. 6,931,926, with the type of liquid (e.g., JP8 turbine fuel, etc.) displayed on the quality indicator 268.

The system is not only capable of differentiating between different liquids, but is also capable of detecting certain contaminants and/or lubricant breakdown due to use. An annunciator 270 for anomalous liquid (light and/or sound alarm, etc.) may be provided to alert the operator of the system to such a condition. The liquid quantity display 266, quality display 268, and annunciator 270 communicate electrically with the processor 264, and may be located with or adjacent to the processor 264, or at some other location remote from the processor 264.

The liquid depth sensing and identification system embodiment of FIG. 4 operates in essentially the same manner as described further above for the simplified embodiment of FIGS. 1A through 3B. Air, vapor, and/or other gas contained within the tank 210 and standpipe 221 is drawn to the pump 230, and pumped downwardly through the dip tube 220 where it exits the dip tube mouth 226. At this point, the maximum pneumatic pressure has been achieved, with the liquid level differential pressure sensor 232 sending an electronic signal corresponding to this pressure to the controller 258. This signal then passes to the processor 264, where it is processed to drive the quantity indicator 266.

It should be noted that this operation is somewhat independent of the liquid quality determination provided by the collector chamber and tube 236 and 234, as it may take some time (i.e., several seconds or so, depending upon the configuration of the system) for the collector chamber and tube 236, 234 to become filled with bubbles escaping from the lower end 226 of the dip tube 220. However, once the collector chamber and tube 236, 234 have become filled with gas from the bubbles escaping from the dip tube 220, the very small difference in pressure head between the lower end 226 of the dip tube and lower end 236 of the collector 234 results in a correspondingly small difference in pneumatic pressure between the dip tube mouth 226 (slightly higher, due to its slightly greater depth) and the collector lower end 236. This very small pressure difference permits the liquid quality differential pressure sensor 246, which is plumbed between the upper portion 224 of the dip tube 220 and the upper end 244 of the collector tube 234, to accurately detect and measure the extremely fine pressure changes that occur as bubbles are emitted from the lower end 226 of the dip tube 220. The electronic signals generated by the liquid quality differential pressure sensor 246 due to these pressure changes pass through the controller 258 to the processor 264, where they are processed for display (e.g., on the chart recorder 150 of the embodiment of FIGS. 1A through 3B, or the readout or display 268 of the embodiment of FIG. 4, etc.).

Figure 5A:
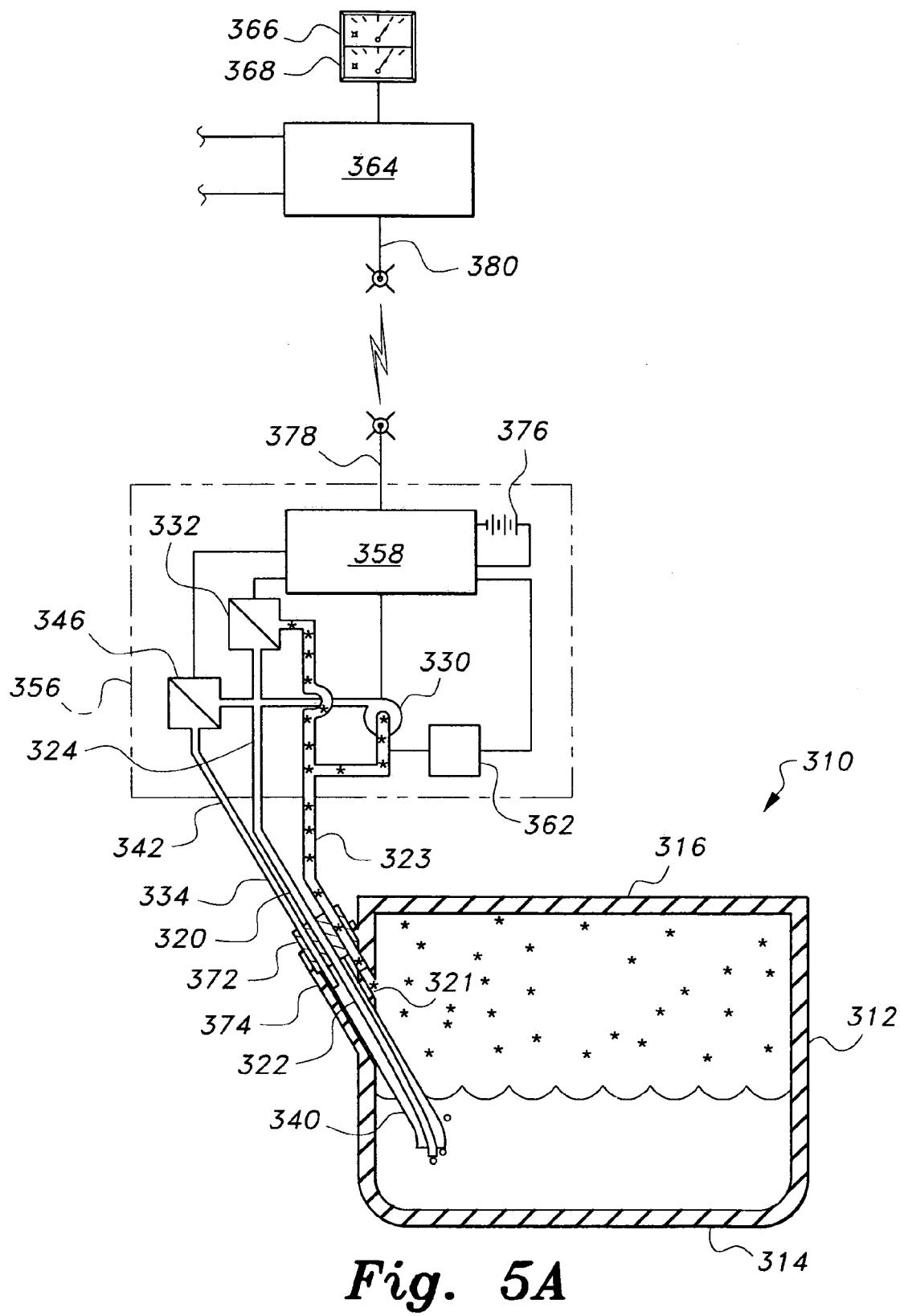
FIG. 5A is a schematic side elevation view of a liquid depth sensing and identification system according to the present invention incorporating the differential pressure principle of operation, shown installed in a closed tank and incorporating a removable probe assembly.
Figure 5B:
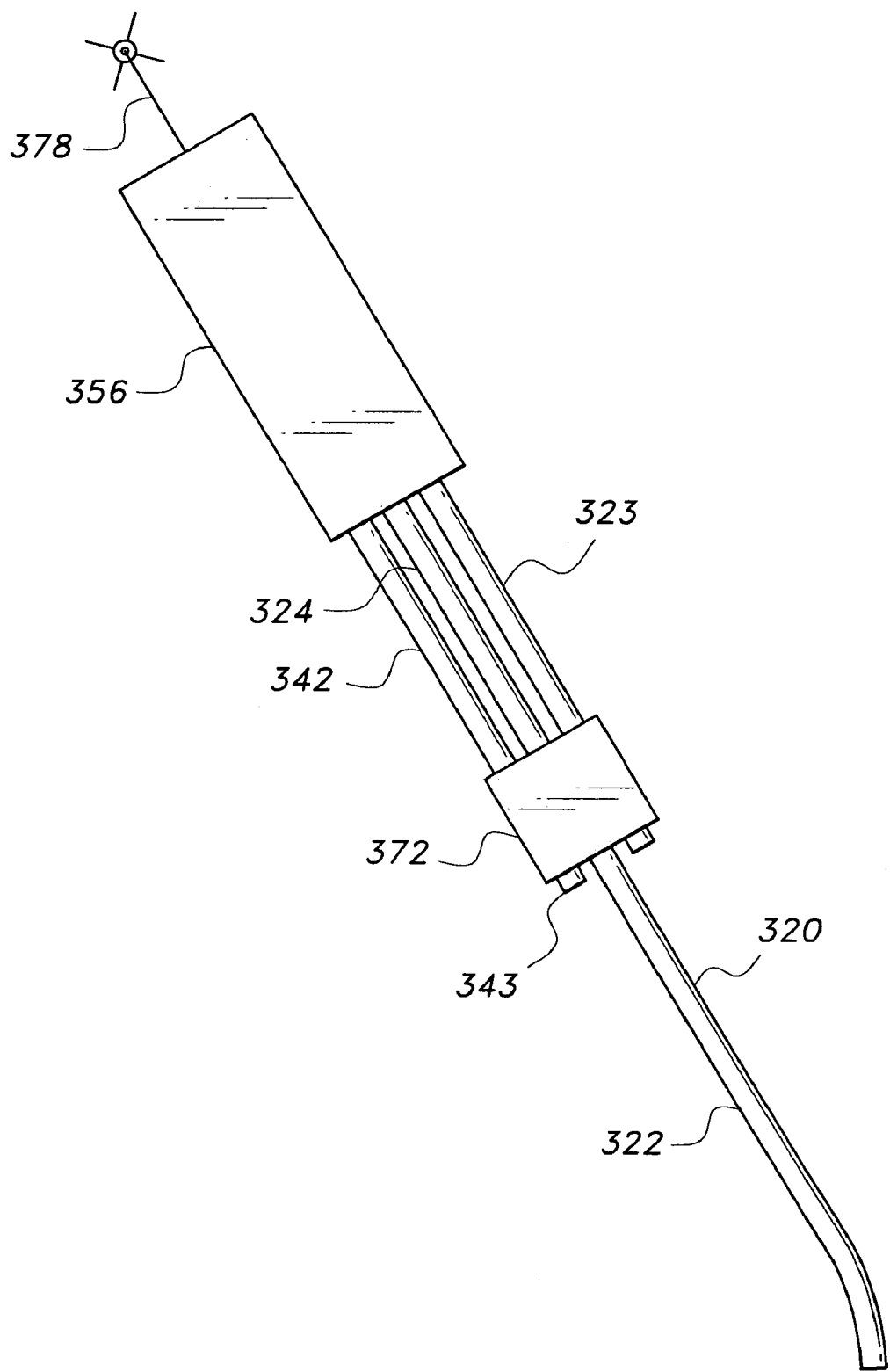
FIG. 5B is a detailed side elevation view of the removable probe assembly of the system of FIG. 5A.
Figure 6:
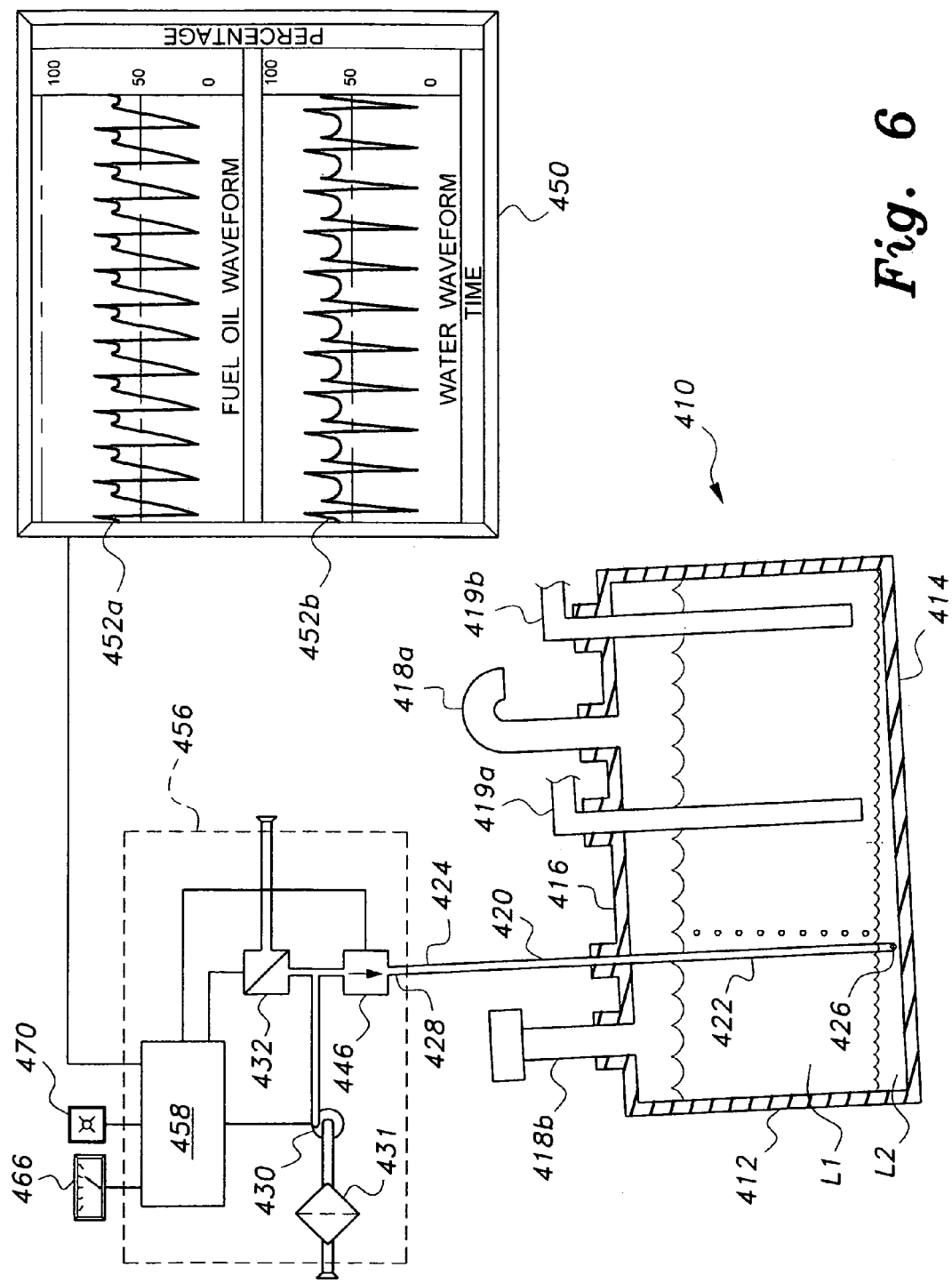
FIG. 6 is a schematic side elevation view of an exemplary liquid depth sensing and identification system according to the present invention that incorporates a mass flow liquid level and identification probe.

FIGS. 5A and 5B illustrate another embodiment of a closed system including a removable pump and sensor assembly and wireless link between the pump and sensor assembly, with its related controller, and the processor and display. The FIGS. 5A and 5B embodiment is especially valuable for use as an engine oil pan, transmission case dipstick, or similar application where the probe must be removed from time to time. The embodiment of FIGS. 5A and 5B includes a closed container 310 for a liquid, e.g., an engine oil pan, a transmission case, etc. The container 310 includes a surrounding peripheral wall or walls 312 and a closed top or cover 316 thereover, e.g., an engine block assembly to which the oil pan is attached, etc.

The embodiment of FIGS. 5A and 5B includes a single, unitary dip tube 320 having a lower portion 322, which is removably inserted into the lower portion 340 of the collector tube 334, and an upper portion 324, which extends into the removable or separable pump and sensor assembly and housing 356. The unitary dip tube 320 may function as a conventional dipstick, assuming it is properly marked. Thus, the oil level may still be checked conventionally in the event of malfunction of the system, depleted battery power, etc. The collector tube 334 is formed as two separate components, i.e., the lower portion 340, which is permanently installed within the container or pan 310, and a separable upper portion 342, which remains with the separable pump and sensor assembly 356.

A passage 321, somewhat analogous to the standpipe 221 of the embodiment of FIG. 4, also extends from the container 314, and mates with an air or vapor return line 323, which extends to the pump and sensor assembly 356. A plug 372 (or alternatively, a threaded cap, a rigid cap with O-ring seal, etc.) seats on or in a mating sleeve or tube 374, which extends from the container or oil pan 310, with the two portions 340 and 342 of the collector tube 334, the passage 321, and return line 323 being sealed to one another to prevent leakage therefrom or therein when the plug or cap 372 is seated on or in its sleeve or tube 374.

The separable pump and sensor assembly 356 is permanently affixed to the upper portion 342 of the collector tube assembly, generally at the plug or cap 372. Extensions of the upper portion 342 of the collector tube, the dip tube 320, and return line 323 may extend between the plug or cap 372 and the housing 356 of the pump and sensor assembly 356, generally as indicated in FIG. 5B of the drawings. The pump and sensor assembly 356 includes a pneumatic pump 330 communicating pneumatically with the return line 323 and upper portion 324 of the dip tube 320; a liquid level differential pressure sensor 332 communicating pneumatically with the upper portion 324 of the dip tube 320 and the return line 323; a liquid quality differential pressure sensor 346 communicating pneumatically with the upper portion 324 of the dip tube 320 and the upper portion 342 of the collector tube 334; and a controller 358, which communicates electrically with the pump motor 330, liquid level differential pressure sensor 332, and liquid quality differential pressure sensor 346.

The pump and sensor assembly 356 may also include a temperature sensor 362, which communicates with the return line 323 and controller 358. As the pump and sensor assembly 356 and its housing comprise a portable, self-contained assembly, some form of electrical power, e.g., battery or batteries 376, are provided within the housing to supply electrical power to the controller 358, pump 330, and other components as required.

Operation of the FIG. 5A and 5B embodiment is much the same as that described further above for other embodiments. The pneumatic pump 330 is actuated, and fills the dip tube 320 with air, vapor, and/or gas drawn from the upper portion of the container 314 through the return line 323. When the dip tube 320 is filled, the gas escaping from the lower or outlet end of the dip tube 320 is captured by the adjacent surrounding mouth of the collector tube 334. Once the collector tube 334 has been filled with gas, the relative pressure head between the dip tube 320 and collector tube 334 is sufficiently small to allow the liquid quality differential pressure sensor 346 to measure the very small pressure pulses occurring as each bubble is emitted from the lower end of the dip tube 320. Meanwhile, the liquid depth differential pressure sensor 332 is providing a signal to the controller 358, relating to the pressure head of liquid in the container 310.

It has been found that the oil pan or sump system described provides sufficient resolution to determine whether oil is relatively new or is used to or beyond a point requiring oil change. Oil becomes contaminated with metallic and non-metallic particles, particularly carbon, during its useful life, and the long chain molecules also tend to break down due to shear forces in bearing and cylinder wall lubrication. The system is capable of detecting these changes, and providing warning of the need to change the oil. Conversely, the system may allow the user to retain the oil for a longer period of time than dictated by conventional time or mileage based change intervals, thus saving the operator some money.

As the pump and sensor assembly 356 is not hard wired to any source of electrical power and is physically independent of other componentry when removed, some means must be provided for the controller 358 to communicate with the separate processor 364 and its quantity and quality gauges or readouts 366 and 368. Accordingly, a transceiver may be placed within both the pump and sensor assembly and housing 356 and with the processor 364. Such transceivers are conventional, and short-range devices providing for the transmission of data between units are well known, e.g., Bluetooth® transceivers. The system preferably uses frequencies in the electromagnetic spectrum, including infrared, but ultrasonic frequencies could be used as well. The signal is transmitted and received from and by the pump and sensor assembly by a first antenna 378, with a second antenna 380 provided for the unit at the processor 364.

FIG. 6 provides a schematic view of yet an embodiment of a liquid depth sensing and identification system wherein the apparatus utilizes a mass flow sensor or meter to detect the very small variations in the "bubble signatures" as the bubbles are released from the outlet end of the dip tube. A liquid depth differential pneumatic sensor is still required in this embodiment, but the collector tube and/or chamber is no longer needed.

The apparatus of FIG. 6 includes a container 410 having a surrounding peripheral wall 412, floor 414, and top or cover 416, similar to the containers 110, 210, and 310 discussed further above. However, the container or tank 410 is more representative of an underground or aboveground storage tank for fuel oil or the like, and accordingly includes a vent pipe 418a open to ambient air, a filler neck and cap assembly 418b, and delivery and return lines 419a and 419b. A single dip tube 420 extends into the tank or container 410, with its lower portion 422 installed in the tank 410 and its opposite upper portion 424 extending externally of the tank 410. The lowermost end 426 of the dip tube 420 is preferably positioned quite close to the bottom 414 of the tank 410, while the opposite upper end 428 communicates pneumatically with the mass flow sensor 446.

All of the electromechanical components of the apparatus of FIG. 6 (and others) are located externally to the tank 410, where they are not subject to contamination or damage by the liquid contents of the tank 410. A pneumatic gas supply pump 430, similar to the other pumps 130, 230, and 330 of other embodiments discussed further above, draws air from an outside source to supply the dip tube 420. The air supply may be passed through a filter 431, if so desired, with the filter 431 also being an option for other embodiments wherein the pump 430 draws its air from a source external to the vented tank. The pneumatic pump 430 supplies air through an outlet line and tee to the liquid depth differential pressure sensor 432, which -is ported or vented to ambient air. The opposite branch of the tee extends to the mass flow sensor or meter 446. A controller 458 communicates electrically with the pump 430, the liquid depth differential pressure sensor 432, and the mass flow sensor 446. The controller 458 may include elements of a processor, in order to drive a liquid quantity indicator or gauge 466 and/or an anomalous liquid annunciator or warning 470. The above-described components, i.e., the pump 430, the liquid depth differential pressure sensor 432, the mass flow sensor 446, and the controller 458, are preferably enclosed within a housing 456, with the quantity or depth gauge 466 and alarm 470 being located outside the housing 456, or at least being visible when viewing the housing 456 if installed in the external shell or surface of the housing.

It will be seen that all of the air or gas exiting the pump 430 outlet must pass through the mass flow sensor 446, and thence down through the dip tube 420 to exit the lowermost outlet end 426 of the dip tube. It has been found that the mass flow sensor 446 is sufficiently sensitive to register the pulses produced by the bubbles as they leave the lower end 426 of the dip tube 420, and, in fact, such a mass flow sensor 446 possesses sufficient sensitivity to recognize the distinctions in different "bubble signatures" as the bubbles form in different liquids. This is the same benefit provided by the embodiments of FIGS. 1A through 5, which incorporate liquid quality differential pressure sensors, but the mass flow sensor 446 of the embodiment of FIG. 6 does not require a second collector tube or chamber surrounding the mouth 426 of the dip tube 420, as is required in other embodiments. Although mass flow sensors at present are considerably more costly and bulky than differential pressure sensors, the system envisions the use of either differential pressure sensors or mass flow sensors or both, as desired.

The mass flow sensor 446 is capable of detecting different "bubble signatures" due to bubble formation in different liquids, as noted above. FIG. 6 further includes a representation of a chart recorder 450, in which two different wave forms or "bubble signatures" 452a and 452b are displayed. In actuality, the two waveforms 452a and 452b would not be displayed together in real time, as the lower end of the dip tube 420 is submerged in only one type of liquid at any one time.

However, the tank 410 of FIG. 6 includes two different liquids L1 and L2 therein, e.g., fuel oil L1 on top with a relatively thin layer of water L2 on the bottom of the tank. A review of the two waveforms or "bubble signatures" 452a and 452b of the chart recorder 450, shows that the two waveforms are distinct from one another. Aside from the more asymmetric peaks of each bubble pulse for the fuel oil wave form L1 as compared to the water wave form L2, it will be noted that there are slightly fewer pulses per unit of time with the water waveform than for the fuel oil waveform, i.e., there are fewer bubbles formed and emitted over a given period of time when the mouth 426 of the dip tube 420 is immersed in water, than when the dip tube mouth 426 is immersed in fuel oil. This is due to the different surface tension and viscosity characteristics of the two liquids.

The system in its various embodiments, and particularly the controller and/or processor components, is capable of recognizing these different waveform characteristics (e.g., due to the difference in frequency and amplitude of bubble emission per unit of time), and producing a warning via the annunciator 470 when e.g., water is detected in a fuel oil tank, as shown in FIG. 6.

Any of the above-described systems, whether incorporating differential pressure sensors or a mass flow sensor for resolution of the "bubble signatures," may be incorporated in any of the various embodiments and applications described herein, as well as other practicable installations and applications.

It is to be understood that the present invention is not limited to the embodiments described above, but encompasses any and all embodiments within the scope of the following claims.

I claim:

1. A liquid depth sensing and identification system, comprising:

a liquid container having at least one peripheral wall and a floor;

a gas delivery dip tube extending into the container, the dip tube having a lower portion and an open lower end spaced above the floor of the container, and an upper portion and an upper end disposed externally to the container;

a pneumatic gas supply pump disposed externally to the container, the pump communicating pneumatically with the upper portion of the dip tube;

a gas collector disposed concentrically about the lower portion of the dip tube, the gas collector having a lower edge disposed slightly above the open lower end of the dip tube;

a collector outlet tube extending from the collector, the outlet tube having a lower portion disposed within the container and an upper portion disposed externally to the container;

a liquid depth differential pressure sensor disposed externally to the container, the depth pressure sensor communicating pneumatically with the dip tube and with ambient pressure;

a liquid quality differential pressure sensor disposed externally to the container, the quality pressure sensor communicating pneumatically with the dip tube and with the collector outlet tube;

a pump controller disposed externally to the container, the controller communicating electrically with the pneumatic gas supply pump, the liquid depth differential pressure sensor, and the liquid quality differential pressure sensor; and a processor disposed externally to the container, the processor communicating electrically with the pump controller.

2. The liquid depth sensing and identification system according to claim 1, further including:

a liquid depth indicator disposed externally to the container and communicating electrically with the processor; and a liquid quality indicator disposed externally to the container and communicating electrically with the processor.

3. The liquid depth sensing and identification system according to claim 1, further including an ambient pressure sensor disposed externally to the container and communicating electrically with the controller.

4. The liquid depth sensing and identification system according to claim 1, further including a liquid and gas temperature sensor disposed externally to the container and communicating electrically with the controller.

5. The liquid depth sensing and identification system according to claim 1, further including an annunciator for anomalous liquid, disposed externally to the container and communicating electrically with the processor.

6. The liquid depth sensing and identification system according to claim 1, further including an open loop control circuit electrically connecting the pump and the pump controller, the circuit governing operation of the pump in accordance with signals from the pump controller.

7. The liquid depth sensing and identification system according to claim 1, wherein the liquid container comprises a closed container including a top having a standpipe extending from the container, the standpipe being connected pneumatically to the liquid depth differential pressure sensor and communicating therewith.

8. The liquid depth sensing and identification system according to claim 1, wherein:

the container is open to ambient atmosphere; and the differential pressure sensor is exteriorly vented relative to the container.

9. The liquid depth sensing and identification system according to claim 1, further including a pump and sensor assembly affixed to and extending from the upper portion of the collection chamber outlet tube, with the pneumatic gas supply pump, the liquid depth differential pressure sensor, the liquid quality differential pressure sensor, and the pump controller being disposed therewith, the upper portion of the collector outlet tube and pump and sensor assembly therewith being separably connected to the lower portion thereof.

10. The liquid depth sensing and identification system according to claim 9, further including:

electromagnetic signal transmitting and receiving means disposed with the pump and sensor assembly; and electromagnetic signal transceiver disposed with the processor, with the pump and sensor assembly and processor communicating with one another by the electromagnetic signal transceiver.

11. A liquid depth sensing and identification system, comprising:

a liquid container having at least one peripheral wall and a floor;

a gas delivery dip tube extending into the container, the dip tube having a lower portion and an open lower end spaced above the floor of the container, and an upper portion and an upper end disposed externally to the container;

a pneumatic gas supply pump disposed externally to the container, the pump communicating pneumatically with the upper portion of the dip tube;

a liquid depth and quality mass flow sensor disposed externally to the container, the mass flow sensor being in series with, and communicating pneumatically with, the upper portion of the dip tube and the gas supply pump; and a pump controller disposed externally to the container, the controller communicating electrically with the pneumatic gas supply pump and the liquid depth and quality mass flow sensor.

12. The liquid depth sensing and identification system according to claim 11, further including:

a liquid depth indicator disposed externally to the container and communicating electrically with the controller; and a liquid quality indicator disposed externally to the container and communicating electrically with the controller.

13. The liquid depth sensing and identification system according to claim 11, further including a vapor pressure sensor disposed externally to the container and communicating electrically with the controller and pneumatically with the liquid depth and quality mass flow sensor.

14. The liquid depth sensing and identification system according to claim 11, further including a liquid and gas temperature sensor disposed externally to the container and communicating electrically with the controller.

15. The liquid depth sensing and identification system according to claim 11, further including an annunciator for anomalous liquid, the annunciator being disposed externally to the container and communicating electrically with the controller.

16. The liquid depth sensing and identification system according to claim 11, further including an open loop control circuit electrically connecting the pump and the pump controller, the circuit governing operation of the pump in accordance with signals from the pump controller.

17. The liquid depth sensing and identification system according to claim 11, wherein the liquid container comprises a closed container having a top and a standpipe extending into the container, the standpipe being connected pneumatically to the liquid depth and quality mass flow sensor and communicating therewith.

18. The liquid depth sensing and identification system according to claim 11, wherein:

the container is open to ambient atmosphere; and the liquid depth and quality mass flow sensor is exteriorly vented relative to the container.

19. The liquid depth sensing and identification system according to claim 11, further including a pump and sensor assembly affixed to and extending from the upper portion of the dip tube, with the pneumatic gas supply pump, the liquid depth and quality mass flow sensor, and the pump controller being disposed therewith, the upper portion of the dip tube and pump and sensor assembly therewith being separably connected to the lower portion thereof.

20. The liquid depth sensing and identification system according to claim 19, further including:
- an electromagnetic signal transceiver disposed with the pump and sensor assembly;
- a processor remotely disposed from the pump and sensor assembly; and
- an electromagnetic signal transceiver disposed with the processor, the pump and sensor assembly and processor communicating with one another by the electromagnetic signal transceivers.

* * * * *